(12) United States Patent
Yasuda et al.

(10) Patent No.: US 12,354,286 B2
(45) Date of Patent: Jul. 8, 2025

(54) POSITIONING METHOD, POSITIONING DEVICE, AND POSITIONING SYSTEM

(71) Applicant: NEC Corporation, Tokyo (JP)

(72) Inventors: Shinya Yasuda, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 17/911,753

(22) PCT Filed: Mar. 27, 2020

(86) PCT No.: PCT/JP2020/013964
§ 371 (c)(1),
(2) Date: Sep. 15, 2022

(87) PCT Pub. No.: WO2021/192211
PCT Pub. Date: Sep. 30, 2021

(65) Prior Publication Data
US 2023/0196590 A1    Jun. 22, 2023

(51) Int. Cl.
*G06T 7/246* (2017.01)

(52) U.S. Cl.
CPC .... *G06T 7/251* (2017.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2020/0074196 A1* | 3/2020 | Gui | G06T 7/70 |
| 2020/0258253 A1 | 8/2020 | Maeda | |

FOREIGN PATENT DOCUMENTS

| | | | |
|---|---|---|---|
| CN | 109646924 A | * | 4/2019 |
| JP | 2010-014450 A | | 1/2010 |
| JP | 2010-020729 A | | 1/2010 |
| JP | 2010236891 A | * | 10/2010 |
| JP | 2019-128175 A | | 8/2019 |
| WO | 2019/087581 A1 | | 5/2019 |

OTHER PUBLICATIONS

English translation of JP-2010236891-A. (Year: 2010).*
English translation of CN-109646924-A. (Year: 2019).*
International Search Report for PCT Application No. PCT/JP2020/013964, mailed on Jul. 7, 2020.
Japanese Office Action dated Jun. 13, 2023 in Japanese Application No. 2022-510315.
JP Trial and Appeal Decision for JP Application No. 2022-510315, mailed on Apr. 1, 2025 with English Translation.

* cited by examiner

*Primary Examiner* — Thomas D Lee

(57) ABSTRACT

A positioning method is configured to determine intra-image coordinates representing the position of a moving body in the captured image of a moving body while acquiring real-space coordinates representing the position of the moving body in real space. The intra-image coordinates of the moving body are transformed into the real-space coordinates of the moving body according to the association between the intra-image coordinates and the real-space coordinates.

12 Claims, 8 Drawing Sheets

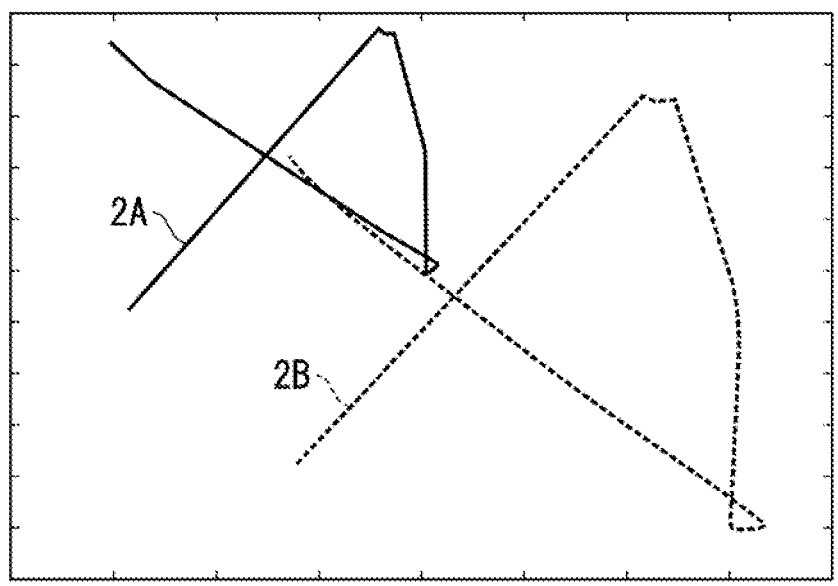

POSITIONING METHOD, POSITIONING DEVICE, AND POSITIONING SYSTEM

This application is a National Stage Entry of PCT/JP2020/013964 filed on Mar. 27, 2020, the contents of all of which are incorporated herein by reference, in their entirety.

TECHNICAL FIELD

The present invention relates to a positioning method, a positioning device, and a positioning system.

BACKGROUND ART

The position of a moving body has been determined with reference to images of the moving body captured by multiple imaging devices. For example, multiple imaging devices can be located at multiple positions to capture images of a moving body at different positions. It is possible to detect the position of a moving body based on the positions of imaging devices configured to output captured images each reflecting a moving body and the imaging scopes of imaging devices.

Patent Document 1 and Patent Document 2 disclose related technologies. Patent Document 1 discloses a position-measuring technology to measure the position and the attitude to capture images as well as a three-dimensional position of a photographed object while reducing errors due to any change of photographing scenes and variations of imaging devices. Patent Document 2 discloses a technology to improve an accuracy of identifying an object robustly irrespective of partly cutoff of imaging even when part of a target object is partly cut off from its captured image.

CITATION LIST

Patent Literature Document

Patent Document 1: Japanese Patent Application Publication No. 2010-14450
Patent Document 2: International Publication No. WO 2019/087581

SUMMARY OF INVENTION

Technical Problem

An angle formed between an optical axis of an imaging device in its imaging direction and a traveling plane for a moving body to travel on may be frequently differentiated depending on the position for locating an imaging device and its imaging direction. An angle formed between an optical axis of an imaging device in its imaging direction and a traveling plane for a moving body to travel on should be differentiated for each imaging device due to an artificial factor such as a policy of locating an imaging device. Considering an operation mode, however, it is difficult to coordinate an angle formed between an optical axis of an imaging device in its imaging direction and a traveling plane for a moving body to travel on with respect to every imaging device.

When different imaging devices are used to capture images of a moving body for the purpose of determining coordinates representing the position a moving body in a real space, errors may occur when determining coordinates by calculations. When multiple imaging devices are used to capture images of the same target object, different coordinates should be determined with respect to the same target object due to errors included in coordinates determined by each imaging device. Therefore, it is requested to develop a technology of accurately detecting real-space coordinates in a two-dimensional plane in correspondence with intra-image coordinates in a captured image output from each imaging device.

For this reason, the present invention aims to provide a positioning method, a positioning device, and a positioning system which can solve the aforementioned problem.

Solution to Problem

In a first aspect of the present invention, a positioning method is designed to determine intra-image coordinates representing a position of a moving body in the captured image of the moving body, to acquire from a measurement device real-space coordinates representing the position of the moving body in real space, and to transform the intra-image coordinates of the moving body into the real-space coordinates of the moving body based on the intra-image coordinates and the real-space coordinates.

In a second aspect of the present invention, a positioning device is configured to determine intra-image coordinates representing the position of a moving body in the captured image of the moving body, to acquire from a measurement device real-space coordinates representing the position of the moving body in real space, to transform the intra-image coordinates of the moving body into the real-space coordinates of the moving body based on the intra-image coordinates and the real-space coordinates.

In a third aspect of the present invention, a positioning system includes a positioning device and a measurement device, wherein the positioning device is configured to determine intra-image coordinates representing the position of a moving body in the captured image of the moving body, to acquire from the measurement device real-space coordinates representing the position of the moving body in real space, and to transform the intra-image coordinates of the moving body into the real-space coordinates of the moving body based on the intra-image coordinates and the real-space coordinates.

Advantageous Effects of Invention

According to the present invention, it is possible to accurately detect real-space coordinates in a two-dimensional plane in correspondence with coordinates in a captured image output from each imaging device

BRIEF DESCRIPTION OF DRAWINGS

FIG. 7 is a first drawing showing real-space coordinates determined based on captured images according to the related technology.

FIG. 8 is a second drawing showing real-space coordinates determined based on captured images according to the first exemplary embodiment of the present invention.

DESCRIPTION OF EXEMPLARY EMBODIMENTS

Hereinafter, a positioning system according to the first exemplary embodiment of the present invention will be described with reference to the accompanying drawings.

Figure 1:
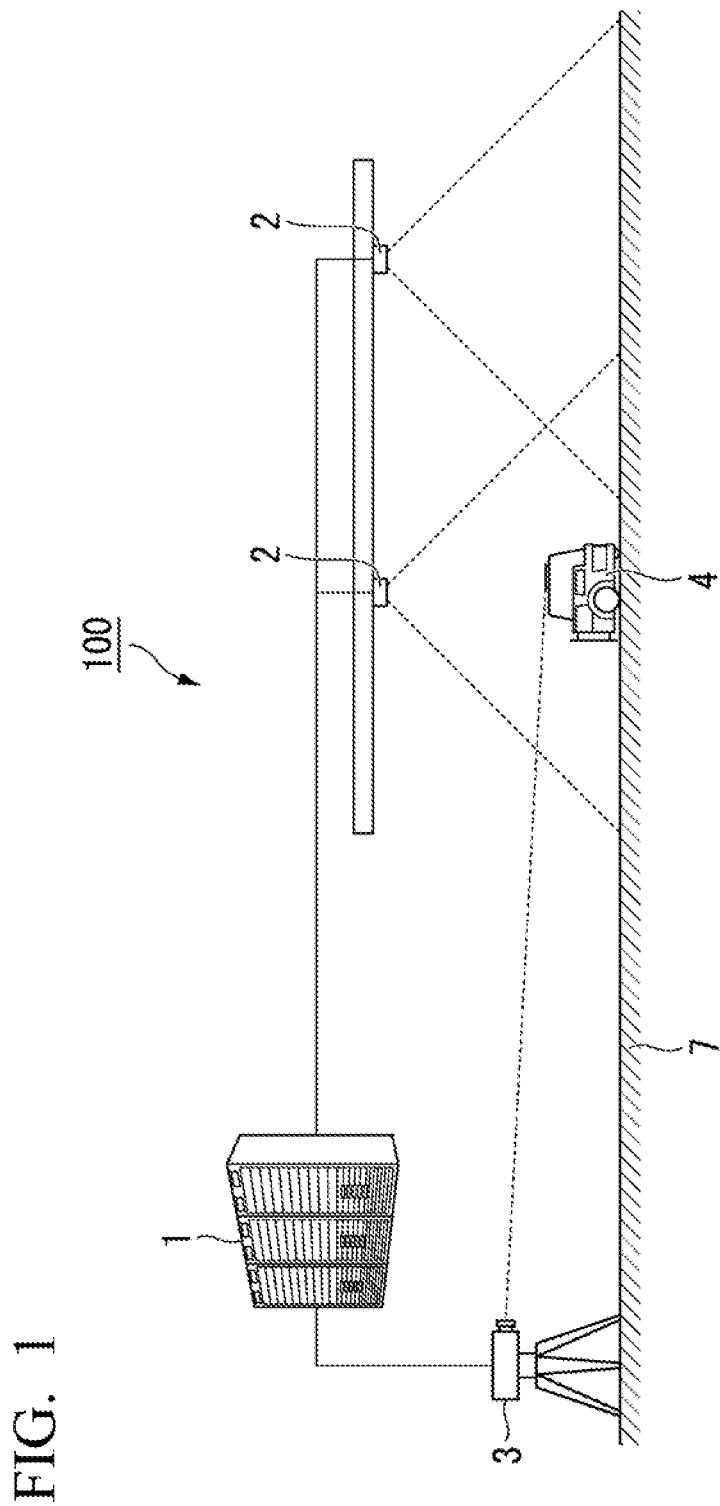
FIG. 1 is a schematic illustration of a positioning system according to the first exemplary embodiment of the present invention.

FIG. 1 is a schematic illustration of the positioning system according to the present exemplary embodiment.

As shown in FIG. 1, a positioning system 100 includes a positioning device 1, an imaging device 2, a measuring device 3, and a moving body 4. The positioning device 1 communicates with the imaging device 2 and the measuring device 3.

The positioning device 1 is a computer. The imaging device 2 is configured to capture an image in a field in which the moving body 4 can move. The positioning device 1 is configured to determine the position of the moving body 4 in a real space base on an image of the moving body 4 captured by the imaging device 2 and the information determined by the measuring device 3.

The moving body 4 is a robot, a conveyance vehicle, or the like. The positioning device 1 is configured to acquire an image captured by the imaging device 2. In addition, the positioning device 1 is configured to acquire the measurement information detected by the measurement device 3 such as real-space coordinates of the moving body 4 detected by the measurement device 3. The positioning device 1 may repeatedly acquire the measurement information detected by the measurement device 3 over a lapse of time. The method how to determine the real-space position of the moving body 4 based on the image of the moving body 4 captured by the imaging device 2 and the information determined by the measurement device 3 will be discussed later.

The imaging device 2 is configured to capture an image of a traveling plane 7 along which the moving body 4 may travel, thus producing a captured image. The imaging device 2 is configured to transmit to the positioning device 1 the imaging information including a captured image and a time of producing the captured image.

The positioning system 100 may include a plurality of imaging devices 2. In this case, the imaging devices 2 are each configured to transmit the imaging information to the positioning device 1. In the present exemplary embodiment, the positioning system 100 includes a plurality of imaging devices 2. The imaging devices 2 are each configured to capture images in different imaging scopes with respect to the traveling plane 7. Either the captured images produced by multiple imaging devices 2 may reflect any field of the traveling plane 7 along which the moving body 4 may travel. One imaging device 2 may have an imaging scope which may partly overlap with an imaging scope of another imaging device 2, alternatively, the imaging devices 2 have different imaging scopes which are not overlapped with each other. Accordingly, it is possible to realize an entire imaging scope of the moving body 4 by concatenating the imaging scopes of the imaging devices 2.

The moving body 4 may move on the traveling plane 7. For example, the moving body 4 is a robot, a conveyance vehicle, or the like. For example, the moving body 4 may move on the traveling plane 7 under the control of a remove-control device configured to communicate with the moving body 4. For example, the moving body 4 may move on the traveling plane 7 by reading magnetic tapes (or guide tapes) adhered to the traveling plane 7, or the moving body 4 may move on the traveling plane 7 by detecting markers located in a movable area of the moving body 4. Alternatively, the moving body 4 may move according to instruction signals received from a remote controller.

The measurement device 3 is configured to determine the position of a target object in real space. For example, the measurement device 3 is an electronic tacheometer. For example, the measurement device 3 may be a three-dimensional measurement device such as a three-dimensional laser scanner. For example, the measurement device 3 is configured to measure a distance towards the moving body 4 according to the timing of irradiating a laser beam and the timing of receiving a reflected beam produced by the moving body 4 reflecting the laser beam. In addition, the measurement device 3 is configured to measure a revolving angle based on variations of directions for irradiating laser beams towards the moving body 4. Based on the aforementioned measured information, the measurement device 3 is configured to calculate real-space coordinates of the moving body 4 with reference to an origin assigned to the measurement device 3. The measurement device 3 is configured to detect the time of detecting real-space coordinates of the moving body 4. The measurement device 3 transmits to the positioning device 1 the measurement information including real-space coordinates of the moving body 4 and the time of detecting real-space coordinates. In the present exemplary embodiment, the measurement device 3 is equipped with a tracking function to track the moving body 4.

Figure 2:
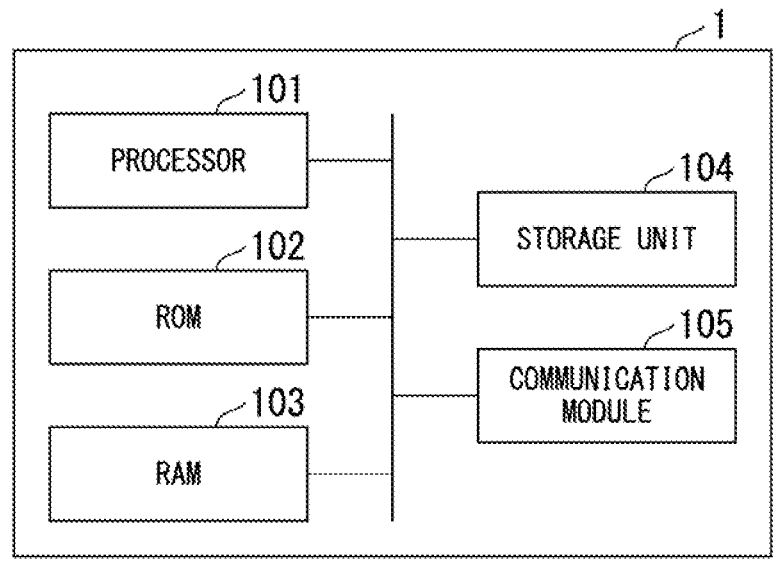
FIG. 2 is a hardware configuration diagram of a positioning device according to the first exemplary embodiment of the present invention.

FIG. 2 is a hardware configuration diagram of the positioning device 1.

As shown in FIG. 2, the positioning device 1 is a computer server including hardware elements such as a processor 101, ROM (Read-Only Memory) 102, RAM (Random-Access Memory) 103, a storage unit 104, and a communication module 105. For example, the processor 101 is a CPU (Central Processing Unit), a GPU (Graphics Processing Unit), or the like. For example, the storage unit 104 is HDD (Hard-Disk Drive), SSD (Solid-State Drive), a memory card or the like. In this connection, the storage unit 104 may be configured to memory devices such as RAM and ROM. The communication module 105 is configured to receive data from or transmit data to an external device. In the present exemplary embodiment, the communication module 105 communicates with the imaging device 2 and the measurement device 3 through a wired communication path or a wireless communication path.

Figure 3:
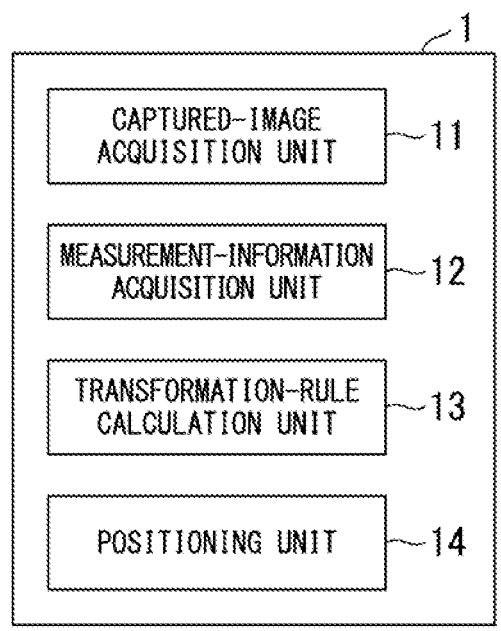
FIG. 3 is a functional block diagram of the positioning device according to the first exemplary embodiment of the present invention.

FIG. 3 is a functional block diagram of the positioning device 1.

The positioning device 1 starts to operate when power is applied thereto so as to execute a positioning program stored in advance. Thus, the positioning device 1 may demonstrate various functions such as a captured-image acquisition unit 11, a measurement-information acquisition unit 12, a transformation-rule calculation unit 13, and a positioning unit 14.

The positioning device 1 is configured to determine intra-image coordinates representing the position of the moving body 4 in its captured image and to acquire real-space coordinates representing the position of the moving body 4 in real space based on the measurement information. Based on the association between intra-image coordinates and real-space coordinates according to the time information for determining intra-image coordinates and real-space coordinates of the moving body 4, the positioning device 1 is configured to calculate the transformation-rule information representing transformation rules for transforming intra-image coordinates into real-space coordinates. In the present exemplary embodiment, the transformation-rule information includes projective-transformation parameters constituting a projective-transformation formula for transforming intra-image coordinates into real-space coordinates. The positioning device 1 is configured to transform intra-image coordinates of the moving body 4 into real-space coordinates of the moving body 4 based on the transformation-rule information.

Figure 4:
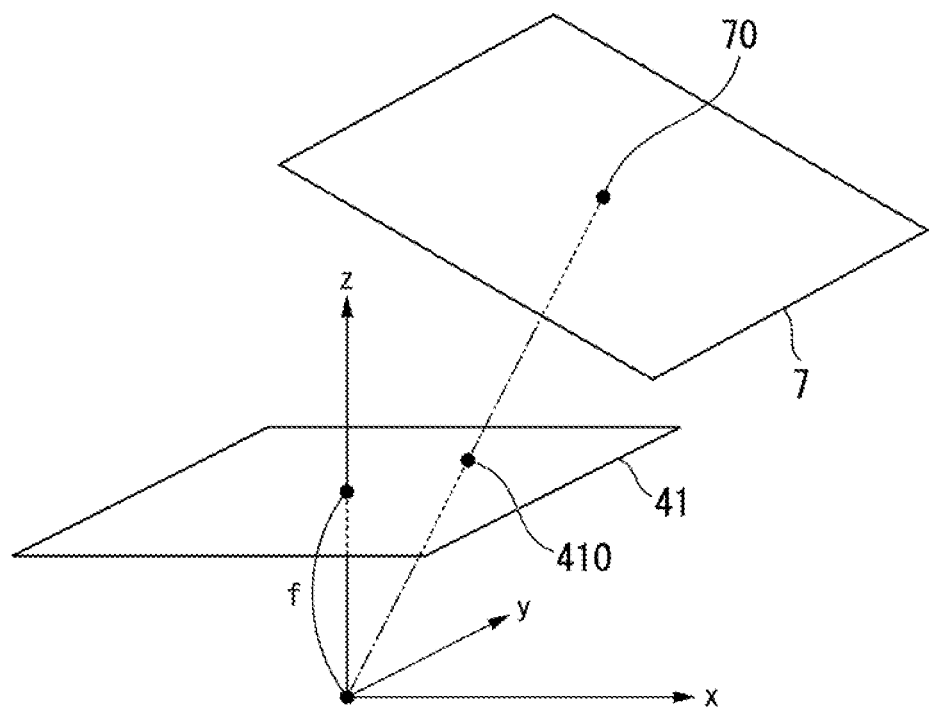
FIG. 4 is a graphic drawing for explaining projective transformation according to the first exemplary embodiment of the present invention.

FIG. 4 is a graphic drawing for explaining projective transformation.

FIG. 4 shows a plane 41 reflected in an image captured by the imaging device 2 at a focal point f and the traveling plane 7 in real space. Herein, intra-image coordinates 410 on the plane 41 are indicated by (x,y,z). In addition, real-space coordinates 70 on the traveling plane 7 are indicated by (x',y',z'). The following formula (1) shows a formula of projective transformation from the intra-image coordinates 410 on the plane 41 to the real-space coordinates on the traveling plane 7.

$$\begin{cases} x' = \frac{a_1 x + b_1 y + c_1}{a_0 x + b_0 y + c_0} \\ y' = \frac{a_2 x + b_2 y + c_2}{a_0 x + b_0 y + c_0} \end{cases} \quad \text{[Formula 1]}$$

In Formula (1), projective-transformation parameters are indicated by ($a_0$, $a_1$, $a_2$, $b_0$, $b_1$, $b_2$, $c_0$, $c_1$, $c_2$). In this connection, $c_0$ of projective-transformation parameters is a constant set at $c_0=1$. The positioning device 1 determines three or more associations between intra-image coordinates and real-space coordinates representing the status of the moving body 4 at the same time, wherein these associations and formula (1) are used to calculate projective-transformation parameters $a_0$, $a_1$, $a_2$, $b_0$, $b_1$, $b_2$, $c_1$, $c_2$.

Figure 5:
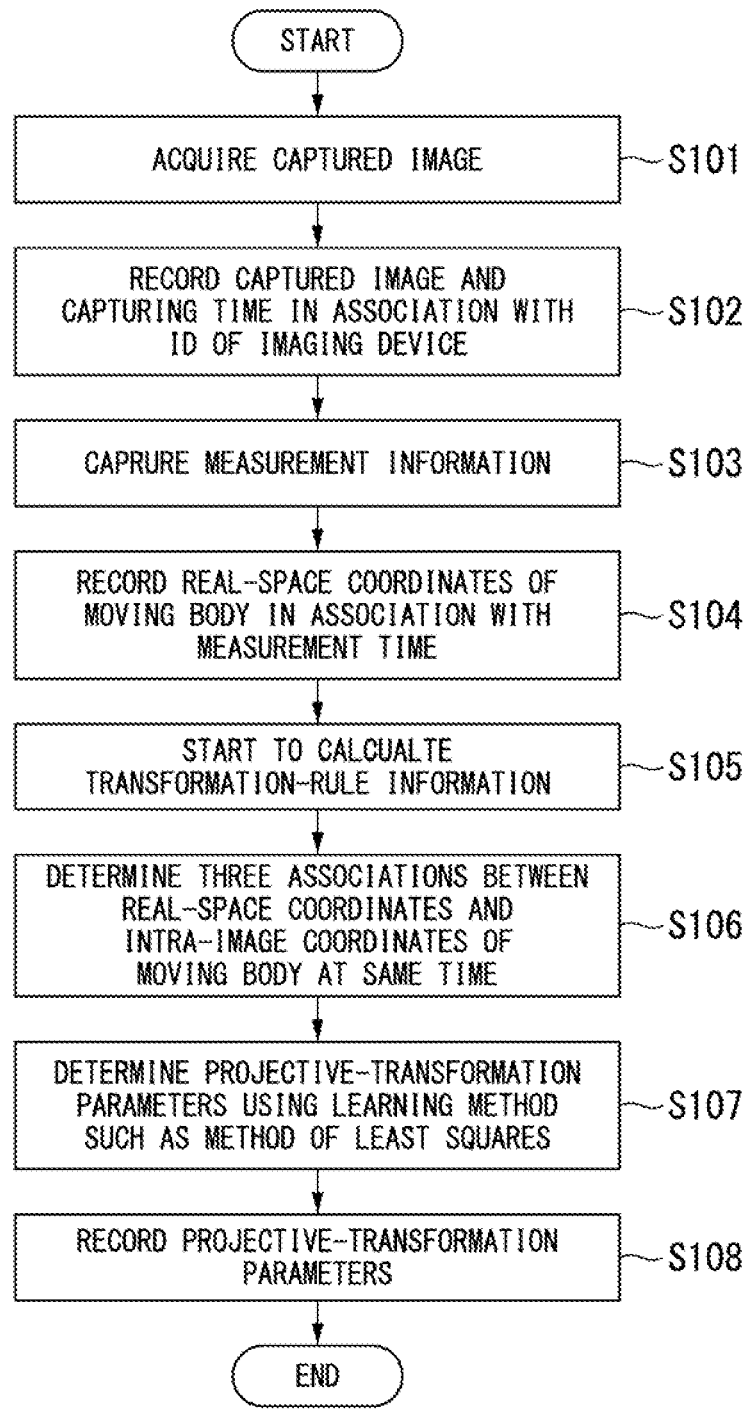
FIG. 5 is a first drawing showing a flow of processing of the positioning device according to the first exemplary embodiment of the present invention.

FIG. 5 is a first drawing showing a flow of processing of the positioning device 1 in the present exemplary embodiment.

Next, a flow of learning processes of the positioning device 1 will be sequentially described below.

The imaging device 2 may capture thirty images or so at predetermined intervals of time while the moving body 4 is moving on the traveling plane 7, thus producing multiple captured images. The imaging device 2 transmits to the positioning device 1 the imaging information including the captured images and its capturing time.

The measurement device 3 measures real-space coordinates of the moving body 4 by tracking the moving body 4 at predetermined intervals of time while the moving body 4 is moving on the traveling plane 7. The measurement device 3 transmits to the positioning device 1 the measurement information including the measured real-space coordinates of the moving body 4 and its measuring time.

In the positioning device 1, the captured-image acquisition unit 11 acquires the imaging information from the imaging device 2 (step S101). The captured-image acquisition unit 11 sequentially records on a captured-image table the captured images and its capturing time included in the imaging information in association with an ID of the imaging device 2 which has transmitted the imaging information (step S102). The captured-image acquisition unit 11 may sequentially record on the captured-image table the captured images and the reception time, at which the positioning device 1 receives the imaging information, instead of the capturing time in association with the ID of the imaging device 2.

The measurement-information acquisition unit 12 acquires the measurement information from the measurement device 3 (step S103). The measurement-information acquisition unit 12 sequentially records on a coordinate table the real-space coordinates of the moving body 4 and its measurement time, which are included in the measurement information and associated with each other (step S104). The measurement-information acquisition unit 12 may record on the coordinate table the real-space coordinates of the moving body 4 in association with the reception time, at which the positioning device 1 receives the measurement information, instead of the measurement time.

Upon receiving a predetermined amount of the imaging information and the measurement information, the transformation-rule calculation unit 13 of the positioning device 1 starts to calculate the transformation-rule information (step S105). The transformation-rule calculation unit 13 designates an imaging-device ID as a subject of processing, which is recorded on the captured-image table in association with a certain time or other times which can be presumed as a certain time irrespective of time differences, thus acquiring the captured image relating to the imaging-device ID and real-space coordinates recorded on the coordinate table. The transformation-rule calculation unit 13 recognizes the acquired captured images and its real-time coordinates as an association between the captured image representing the status of the moving body 4 at a certain time and its real-space coordinates. The transformation-rule calculation unit 13 determines at least three time-base associations between the captured image relating to the ID of the imaging device 2 serving as a subject of processing and its real-space coordinates.

The transformation-rule calculation unit 13 detects the moving body 4 reflected in captured images included in associations via pattern recognition or the like. The transformation-rule calculation unit 13 detects intra-image coordinates of the moving body 4 reflected in captured images. The transformation-rule calculation unit 13 designates associations between real-space coordinates and intra-image coordinates of the moving body 4 at a certain time according to time-base associations between real-space coordinates and captured images relating to the ID of the imaging device 2 serving as a subject of processing. The transformation-rule calculation unit 13 should designate three associations between real-space coordinates and intra-image coordinates of the moving body 4 at a certain time (step S106).

Specifically, the transformation-rule calculation unit 13 uses a pair of intra-image coordinates and real-space coordinates indicated by each association and formula (1) to calculate predictive-transformation parameters $a_0$, $a_1$, $a_2$, $b_0$, $b_1$, $b_2$, $c_1$, $c_2$. In addition, the transformation-rule calculation unit 13 sequentially designate associations between real-space coordinates and other captured images produced by the imaging device 2 serving as a subject of processing so as to similarly and repeatedly calculating projective-transformation parameters $a_0$, $a_1$, $a_2$, $b_0$, $b_1$, $b_2$, $c_1$, $c_2$. The transformation-rule calculation unit 13 uses plenty of projective-transformation parameters $a_0$, $a_1$, $a_2$, $b_0$, $b_1$, $b_2$, $c_1$, $c_2$ according to learning methods such as the method of least squares and other machine learning methods so as to designate a single combination of projective-transformation parameters $a_0$, $a_1$, $a_2$, $b_0$, $b_1$, $b_2$, $c_1$, $c_2$ (step S107).

Since the positioning system 100 includes a plurality of imaging devices 2, the transformation-rule calculation unit 13 similarly calculates projective-transformation parameters $a_0$, $a_1$, $a_2$, $b_0$, $b_1$, $b_2$, $c_1$, $c_2$ according to associations between real-space coordinates and captured images relating to the IDs of the imaging device 2 sequentially determined as a subject of processing. Thus, it is possible for the transformation-rule calculation unit 13 to produce a projective-transformation formula for each imaging device 2 assigned the projective-transformation parameters $a_0$, $a_1$, $a_2$, $b_0$, $b_1$, $b_2$, $c_1$, $c_2$ for each imaging device 2 and $c_0=1$. The transformation-rule calculation unit 13 records on a parameter table of the storage unit 104 the projective-transformation parameters $a_0$, $a_1$, $a_2$, $b_0$, $b_1$, $b_2$, $c_1$, $c_2$ associated with the ID of the imaging device 2 (step S108).

According to the aforementioned processes, it is possible to designate for each imaging device 2 the projective-transformation formula for transforming intra-image coordinates in the captured images of the imaging device 2 into real-space coordinates on the traveling plane 7 with reference to coordinates of the measurement device 3. When measuring the position of the moving body 4, it is possible to transform intra-image coordinates in the captured images of the imaging device 2 into real-space coordinates on the traveling plane 7 with reference to coordinates of the measurement device 3 according to the projective-transformation formulae without using the measurement device 3.

Figure 6:
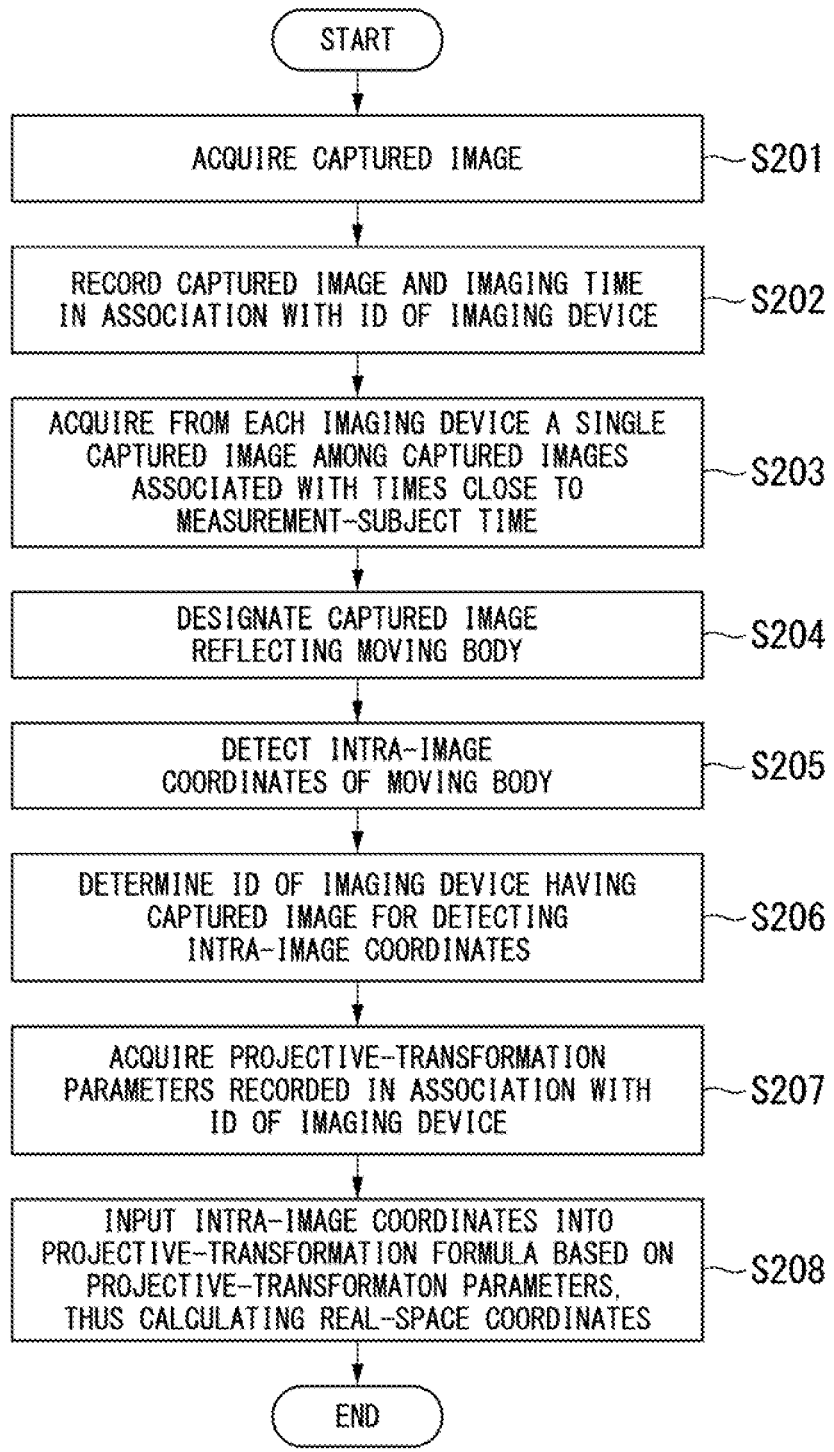
FIG. 6 is a second drawing showing a flow of processing of the positioning device according to the first exemplary embodiment of the present invention.

FIG. 6 is a second drawing showing a flow of processing of the positioning device 1 according to the present exemplary embodiment.

A flow of positioning processes of the positioning device 1 after calculating a projective-transformation formula will be described with reference to FIG. 6.

Each imaging device 2 captures thirty images or in a predetermined short period of time such as each second while the moving body 4 is moving on the traveling plane 7, thus transmitting to the positioning device 1 the imaging information including captured images and its capturing time. The captured-image acquisition unit 11 acquires the imaging information (step S201).

The captured-image acquisition unit 11 records on the storage unit 104 the captured images and its capturing time included in the imaging information in association with the ID of the imaging device 2 which transmits the imaging information (step S202). Other imaging devices 2 installed in the positioning system 100 may similarly transmit the imaging information to the positioning device 1, and therefore the captured-image acquisition unit 11 of the positioning device 1 may sequentially record on the storage unit 104 the captured images in a short period of time in association with the IDs of other imaging devices 2.

To determine the current positioning of the moving body 4, the positioning unit 14 acquires every one of captured images associated with times close to a positioning-subject time from a plurality of captured images associated with the ID of each imaging device 2 (step S203). The positioning unit 14 designates a captured image reflecting the moving body 4 via pattern recognition among a plurality of captured images acquired by the positioning unit 14 (step S204). The positioning unit 14 may designate a captured image reflecting the moving body 4 according to other methods. When a predetermined marker is attached to the moving body 4, for example, the positioning unit 14 may designate a captured image reflecting the moving body 4 by recognizing the marker in the captured image. The positioning unit 14 detects intra-image coordinates of the moving body 4 in the captured image reflecting the moving body 4 (step S205).

Based on the captured image used to detect intra-image coordinates, the positioning unit 14 determines the ID of the imaging device 2 for producing the captured image (step S206). The positioning unit 14 acquires projective-transformation parameters, which are recorded on the parameter table in association with the ID of the imaging device 2 (step S207). The positioning unit 14 inputs intra-image coordinates (x,y) into a projective-transformation formula using projective-transformation parameters, thus calculating real-space coordinates (x',y') (step S208). Accordingly, it is possible for the positioning unit 14 to establish positioning of real-space coordinates of the moving body 4 at the positioning-subject time.

FIG. 7 is a first drawing showing real-space coordinates to be determined based on captured images produced by different imaging devices 2. FIG. 7 shows an example of calculations of real-space coordinates based on captured images produced by different imaging devices 2 without using the aforementioned method. Imaging devices 2 may be frequently differentiated from each other in terms of the angle of an optical axis of the imaging device 2 relative to the traveling plane 7. Therefore, when the imaging devices 2 have imaging scopes covering the same field, it is possible to measure the position of the moving body 4 based on the captured images of the imaging devices 2, wherein deviations may occur in real-space coordinates calculated by the result of positioning. FIG. 7 shows tracks of real-space coordinates calculated without using the aforementioned method when the imaging device 2A and the imaging device 2B capture images including the same field.

FIG. 8 is a second drawing showing real-space coordinates determined based on captured images produced by different imaging devices 2. Assuming that according to the aforementioned process using projective-transformation parameters of the imaging devices 2 and the projective-transformation formula (1), intra-image coordinates of the moving body 4 in the captured image produced by the imaging device 2 and intra-image coordinates of the moving body 4 in the captured image produced by the imaging device 2B are each transformed into real-space coordinates. In this case, as shown in FIG. 8, it is possible to accurately detect the track of the moving body 4 since real-space coordinates may substantially match each other.

The projective-transformation formula using projective-transformation parameters calculated according to the aforementioned process can be regarded as a formula of projective transformation to transform intra-image coordinates in the captured images produced by the imaging devices 2 into real-space coordinates upon assuming that real-space coordinates on the traveling plane 7 measured by the measurement device 3 would be correct information. Therefore, it is possible to transform intra-image coordinates in the captured image produced by either imaging device 2 into a single combination of real-space coordinates on the traveling plane 7 with reference to the position of the measurement device 3.

The aforementioned process may transform intra-image coordinates into real-space coordinates on the traveling plane 7 with reference to a reference point (or an origin) of the measurement device 3. However, it is possible to convert real-space coordinates detected by the measurement device 3 into other coordinate systems using other origins, and therefore it is possible to record on the coordinate table of the storage unit 104 the real-space coordinates in association with its measurement time. Accordingly, it is possible to produce other projective-transformation formulae to performing projective transformation from intra-image coordinates to real-space coordinates in other coordinates systems using other origins.

Second Exemplary Embodiment

Figure 9:
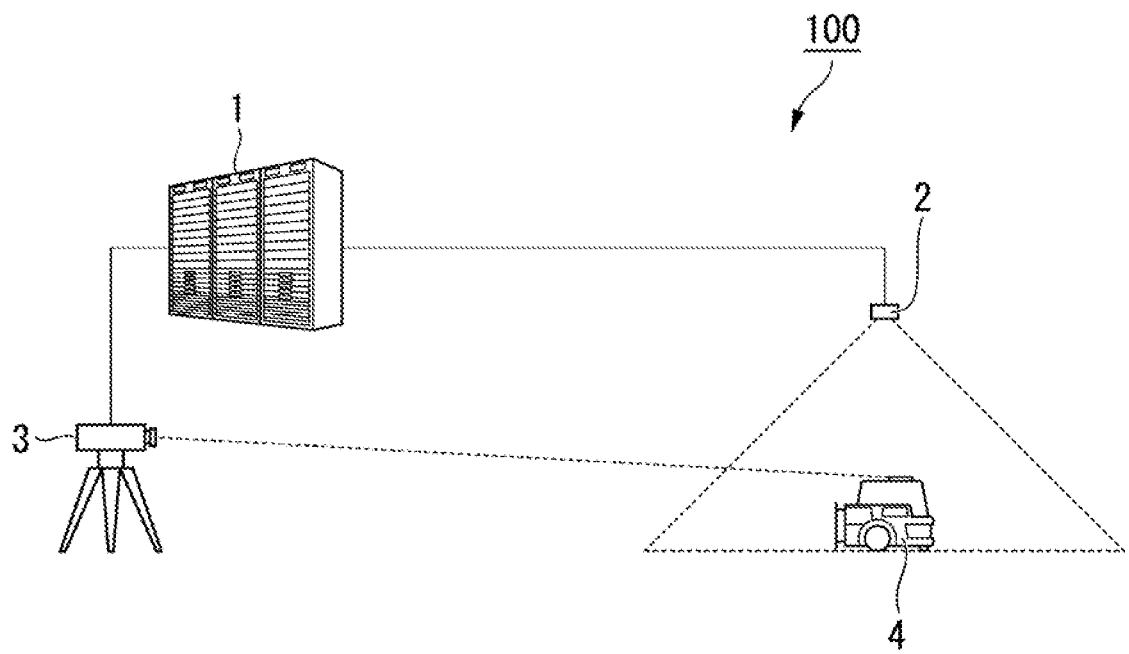
FIG. 9 is a schematic illustration of a positioning system according to the second exemplary embodiment of the present invention.

FIG. 9 is a schematic illustration of a positioning system according to the second exemplary embodiment.

Figure 10:
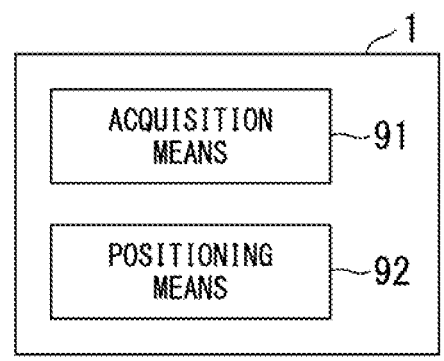
FIG. 10 is a functional block diagram of a positioning device according to the second exemplary embodiment of the present invention.

FIG. 10 is a functional block diagram of a positioning device according to the second exemplary embodiment.

Figure 11:
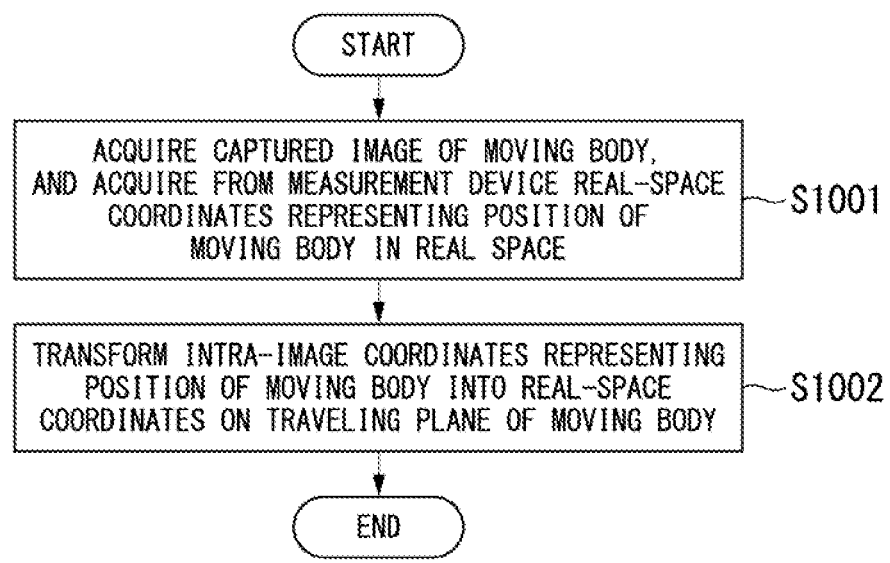
FIG. 11 is flowchart showing a flow of processing of the positioning device according to the second exemplary embodiment of the present invention.

FIG. 11 is a flowchart showing a flow of processing of the positioning device according to the second exemplary embodiment.

The positioning system 100 includes a positioning device 1, which is connected to at least the imaging device 2 configured to capture an image of the moving body 4 and a measurement device 3 configured to determine the position of the moving body 4 in real space. The positioning device 1 is configured to determine intra-space coordinates representing the position of the moving body 4 in a captured image of the moving body 4 and to acquire real-space coordinates of the moving body 4 from the measurement device 3, thus transforming intra-image coordinates of the moving body 4 into real-space coordinates of the moving body 4 based on intra-image coordinates and real-space coordinates.

The positioning device 1 includes an acquirement means 91 and a measurement means 92.

The acquirement means 91 is configured to acquire a captured image of the moving body 4 and to acquire real-space coordinates representing the position of the moving body 4 in real space (step S1001).

Based on real-space coordinates and intra-image coordinates representing the position of the moving body 4 in its acquired image, the measurement means 92 is configured to transform intra-image coordinates representing the position of the moving body 4 in its acquired image into real-space coordinates of the moving body 4 on its traveling plane (step S1002).

The aforementioned positioning device 1 includes a computer system therein. The foregoing processes are stored on computer-readable storage media in the form of programs, wherein a computer may read and execute programs to achieve the foregoing processes. Herein, computer-readable storage media refer to magnetic disks, magneto-optical disks, CD-ROM, DVD-ROM, semiconductor memory or the like. In addition, it is possible to deliver computer programs to computers through communication lines, thus computers receiving programs delivered thereto may execute programs.

The aforementioned programs may realize some of the foregoing functions. Alternatively, the aforementioned programs may be so-called differential files (or differential programs), which may realize the foregoing functions when combined with pre-recorded programs of computer systems.

REFERENCE SIGNS LIST

1 . . . positioning device
2 . . . imaging device
3 . . . measurement device
4 . . . moving body
11 . . . captured-image acquisition unit
12 . . . measurement-information acquisition unit
13 . . . transformation-rule calculation unit
14 . . . positioning unit
100 . . . positioning system

What is claimed is:

1. A positioning method performed by a computer and comprising:
    determining a position of a moving body in intra-image coordinates of a plurality of first captured images including an image of the moving body and captured at a first capture time by a plurality of imaging devices;
    acquiring measurement information including a first position of the moving body in real-space coordinates and being measured at the first capture time;
    calculating, in advance, projective-transformation parameters based on the plurality of first captured images and the measurement information, wherein the projective-transformation parameters transform the first position of the moving body in the intra-image coordinates into the first position of the moving body in the real space coordinates;
    recording an identification of one imaging device among the plurality of imaging devices and the projective-transformation parameters associated with each other, the one imaging device capturing the first captured image; and
    transforming a second position of the moving body in the intra-image coordinates into the second position of the moving body in the real-space coordinates based on a second captured image and the projective-transformation parameters, wherein the second captured image is captured at a second capture time and includes the image of the moving body, and wherein the projective-transformation parameters correspond to an identification of the imaging device capturing the second captured image.

2. The positioning method according to claim 1, wherein the projective-transformation parameters are calculated by specifying at least three associations between the first position of the moving body in the intra-image coordinates and the first position of the moving body in the real space coordinates representing a status of the moving body at the first capture time.

3. The positioning method according to claim 1, wherein the plurality of first captured images are captured by the plurality of imaging devices at a rate of at least 30 images per second.

4. The positioning method according to claim 1, wherein the projective-transformation parameters are calculated according to a machine-learning method.

5. A positioning device comprising:
    a plurality of imaging devices;
    at least one memory storing instructions; and
    at least one processor configured to execute the instructions to:
        determine a position of a moving body in intra-image coordinates of a plurality of first captured images including an image of the moving body and captured at a first capture time by a plurality of imaging devices;
        acquire measurement information including a first position of the moving body in real-space coordinates and being measured at the first capture time;

calculate, in advance, projective-transformation parameters based on a plurality of first captured images and the measurement information, wherein the projective-transformation parameters transform the first position of the moving body in intra-image coordinates into the first position of the moving body in the real space coordinates;

record an identification of one imaging device among the plurality of imaging devices and the projective-transformation parameters associated with each other, the one imaging device capturing the first captured image; and transform a second position of the moving body in the intra-image coordinates into the second position of the moving body in the real-space coordinates based on a second captured image and the projective-transformation parameters, wherein the second captured image is captured at a second capture time and includes the image of the moving body, and wherein the projective-transformation parameters correspond to an identification of the imaging device capturing the second captured image.

6. The positioning device according to claim 5, wherein the at least one processor is configured to execute the instructions to calculate the projective-transformation parameters by specifying at least three associations between the first position of the moving body in the intra-image coordinates and the first position of the moving body in the real space coordinates representing a status of the moving body at the first capture time.

7. The positioning device according to claim 5, wherein the plurality of first captured images are captured by the plurality of imaging devices at a rate of at least 30 images per second.

8. The positioning device according to claim 5, wherein the at least one processor is configured to execute the instructions to calculate the projective-transformation parameters according to a machine-learning method.

9. A positioning system comprising:
a plurality of imaging devices;
a measurement device;
at least one memory storing instructions; and
at least one processor configured to execute the instructions to:
capture, by the plurality of imaging devices, a plurality of first captured images at a first capture time, the plurality of first captured images including an image of a moving body;

determine measurement information including a first position of the moving body in real space coordinates;

determine the position of the moving body in intra-image coordinates of a plurality of first captured images;

calculate, in advance, projective-transformation parameters based on a plurality of first captured images and the measurement information, wherein the projective-transformation parameters transform the first position of the moving body in intra-image coordinates into the first position of the moving body in the real space coordinates;

record an identification of one imaging device among the plurality of imaging devices and the projective-transformation parameters associated with each other, the one imaging device capturing the first captured image; and transform a second position of the moving body in the intra-image coordinates into the second position of the moving body in the real space coordinates based on a second captured image and the projective-transformation parameters, wherein the second captured image is captured at a second capture time and includes the image of the moving body, and wherein the projective-transformation parameters correspond to an identification of the imaging device capturing the second captured image.

10. The positioning system according to claim 9, wherein the at least one processor is configured to execute the instructions to calculate the projective-transformation parameters by specifying at least three associations between the first position of the moving body in the intra-image coordinates and the first position of the moving body in the real space coordinates representing a status of the moving body at the first capture time.

11. The positioning system according to claim 9, wherein the plurality of first captured images are captured by the plurality of imaging devices at a rate of at least 30 images per second.

12. The positioning device according to claim 9, wherein the at least one processor is configured to execute the instructions to calculate the projective-transformation parameters according to a machine-learning method.

* * * * *